(12) United States Patent
Egermann

(10) Patent No.: US 11,794,508 B2
(45) Date of Patent: Oct. 24, 2023

(54) DEVICE AND METHOD FOR RECORDING INFORMATION IN A DATA CARRIER

(71) Applicant: Muehlbauer GmbH & Co. KG, Roding (DE)

(72) Inventor: Sascha Egermann, Oelsnitz (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 416 days.

(21) Appl. No.: 16/971,224

(22) PCT Filed: Feb. 2, 2019

(86) PCT No.: PCT/EP2019/053404
§ 371 (c)(1),
(2) Date: Aug. 19, 2020

(87) PCT Pub. No.: WO2019/162143
PCT Pub. Date: Aug. 29, 2019

(65) Prior Publication Data
US 2021/0086546 A1    Mar. 25, 2021

(30) Foreign Application Priority Data

Feb. 20, 2018 (DE) .......................... 102018001325.2

(51) Int. Cl.
*B42D 25/435* (2014.01)
*B23K 26/08* (2014.01)
(Continued)

(52) U.S. Cl.
CPC ............ *B42D 25/435* (2014.10); *B23K 26/02* (2013.01); *B23K 26/08* (2013.01);
(Continued)

(58) Field of Classification Search
CPC .. B42D 25/435; B42D 25/00; B23K 26/0823; B23K 26/08; B23K 26/02; B41J 3/40731; B41J 3/407; B41M 5/24; B41M 5/26
(Continued)

(56) References Cited

U.S. PATENT DOCUMENTS

2007/0245916 A1    10/2007    Bird et al.
2011/0149405 A1    6/2011    Van Den Berg
(Continued)

FOREIGN PATENT DOCUMENTS

DE    3634865 A1    6/1987
DE    19949945 A1    8/2001
(Continued)

*Primary Examiner* — Justin V Lewis
(74) *Attorney, Agent, or Firm* — Shumaker, Loop & Kendrick, LLP; John A. Miller

(57) ABSTRACT

A device for recording information in a data carrier, comprising a data carrier receptacle for partially receiving the data carrier in a planar manner; a data carrier cover arranged relative to the data carrier receptacle, which is designed for holding the data carrier between the data carrier receptacle and the data carrier cover; a laser source for the controlled emission of a laser beam designed to effect irreversible changes of the data carrier with the laser beam; and a mount that receives the data carrier receptacle to be pivotable about a pivot axis. The data carrier receptacle has two or more positions, that allow the data carrier receptacle to be received in the mount in such a way that the data carrier receptacle can be repositioned about the pivot axis in a pivotable manner.

18 Claims, 4 Drawing Sheets

(51) Int. Cl.
- B41J 3/407 (2006.01)
- B41M 5/24 (2006.01)
- B23K 26/02 (2014.01)
- B41M 5/26 (2006.01)
- B42D 25/00 (2014.01)

(52) U.S. Cl.
CPC ....... *B23K 26/0823* (2013.01); *B41J 3/40731* (2020.08); *B41M 5/24* (2013.01); *B41M 5/26* (2013.01)

(58) Field of Classification Search
USPC ........ 281/15.1, 42, 45, 48; 283/63.1, 67, 70, 283/72, 74, 75, 77, 94, 98; 414/754
See application file for complete search history.

(56) References Cited

U.S. PATENT DOCUMENTS

| | | |
|---|---|---|
| 2014/0056680 A1* | 2/2014 | Lind ................... B42D 25/41 414/754 |
| 2014/0063086 A1 | 3/2014 | Morgavi |
| 2017/0228632 A1 | 8/2017 | Knipp et al. |

FOREIGN PATENT DOCUMENTS

| | | |
|---|---|---|
| DE | 102009021634 A1 | 11/2010 |
| DE | 202016008507 U1 | 3/2018 |
| EP | 0216947 B1 | 4/1987 |
| EP | 1705600 A2 | 9/2006 |
| EP | 2733099 A1 | 5/2014 |
| EP | 3028861 A2 | 6/2016 |
| EP | 3235651 A1 | 10/2017 |
| EP | 3421398 A1 | 1/2019 |
| WO | WO9851507 A1 | 11/1998 |
| WO | WO2008055791 A1 | 5/2008 |
| WO | WO2017120108 A1 | 7/2017 |

* cited by examiner

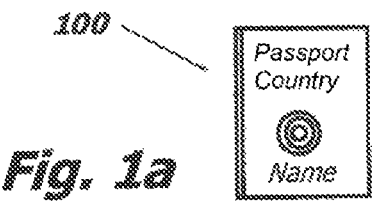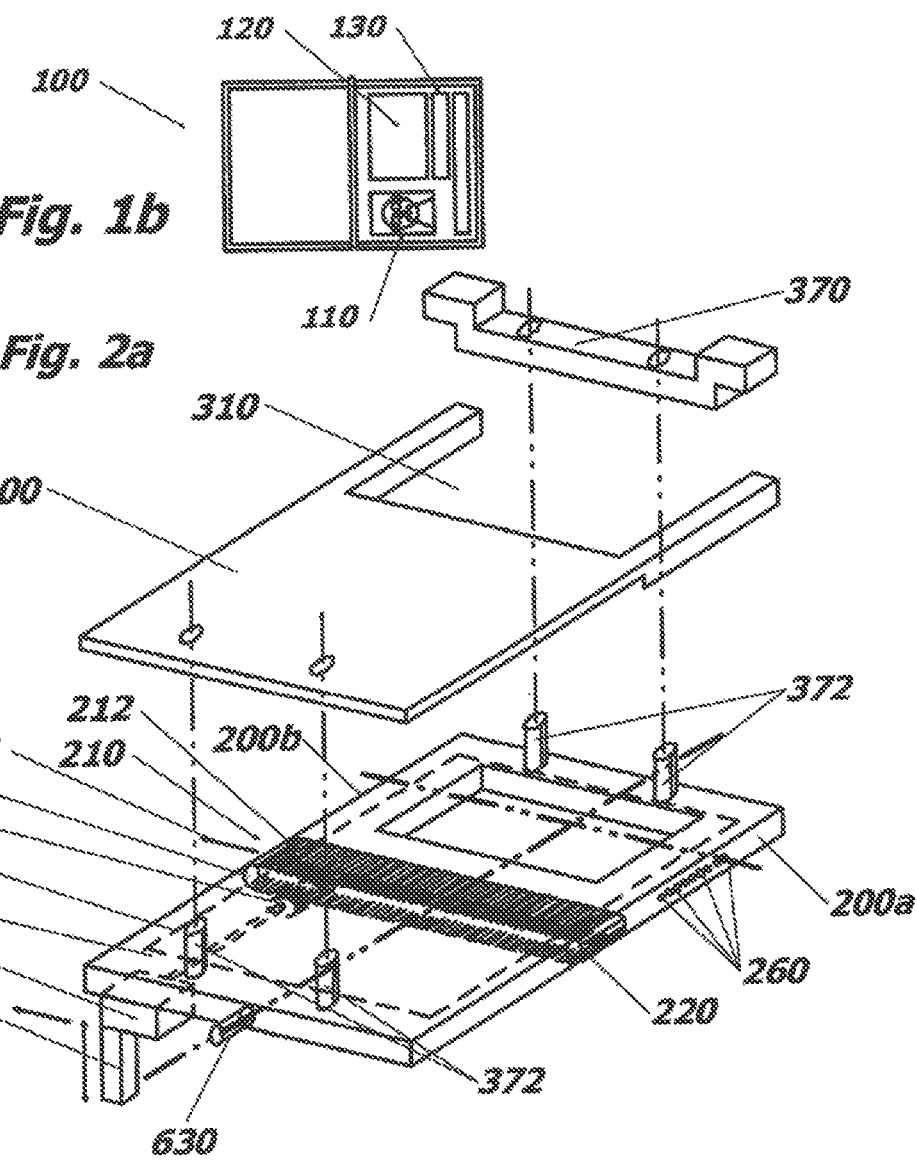

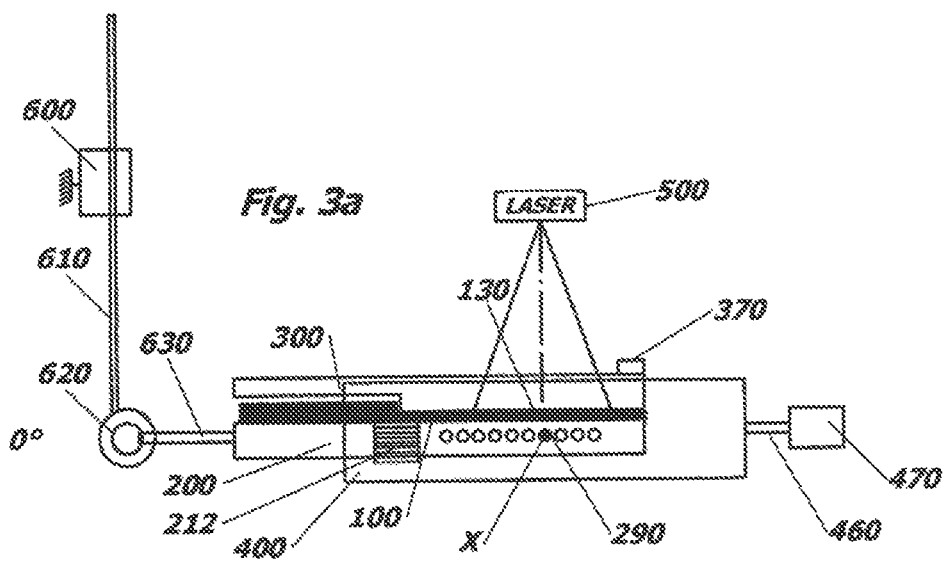
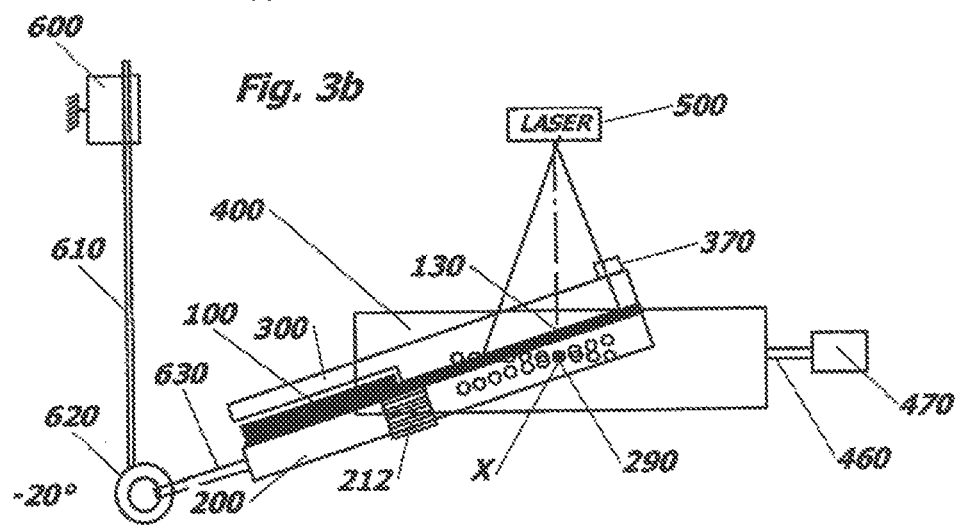
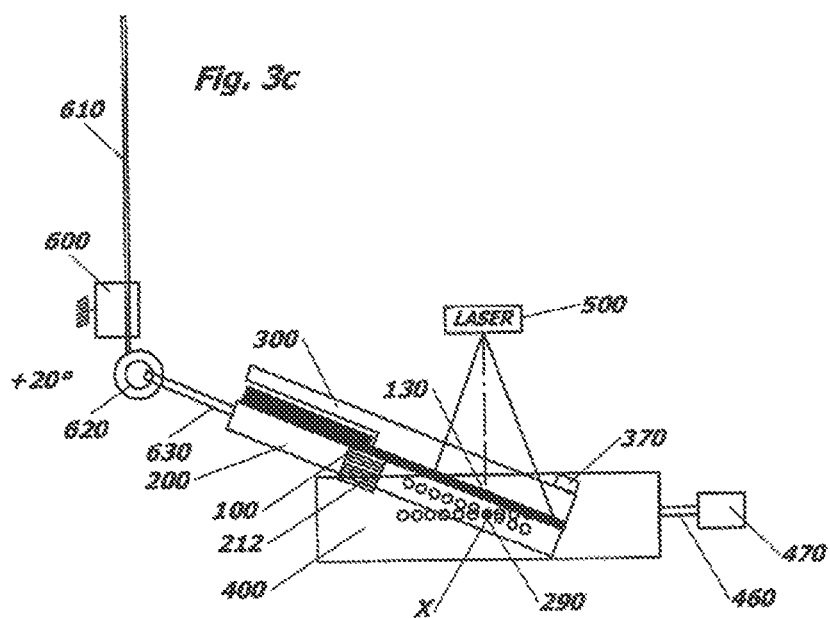

DEVICE AND METHOD FOR RECORDING INFORMATION IN A DATA CARRIER

CROSS-REFERENCE TO RELATED APPLICATIONS

This application is a National Stage application of International Application No. PCT/EP2019/053404 filed on Feb. 12, 2019 which claims priority to German Patent Application Serial No. DE 10 2018 001 325.2 filed Feb. 20, 2018.

BACKGROUND

Field

A device and a method for recording information in a data carrier are here disclosed. In particular, information is thereby recorded by means of a laser beam in an information surface region of a data carrier comprising a carrier layer and one or more transparent plastics layers.

Discussion of the Related Art

Data carriers of the type mentioned here are security or identification documents such as passports, identity cards, driving licenses, passes, credit cards, bank cards, cash payment cards, labels, admission passes and the like. Aspects of the device and of the method are defined both in the description and in the figures and the claims.

The data carriers of the type presented here for use as security or identification documents are generally manufactured centrally, apart from their personalization data, and then provided with personalization decentrally, for example at registration offices, by authorities or by companies authorized to issue such documents. For the personalization, personalization data in the form of text, numerical and/or image data (for example name and address of the holder, date of birth, place of birth, photograph of the holder, biometric data of the holder, etc.) that individually characterize the holder of the security or identification document, as well as the date of issue and period of validity of the document are recorded in the security or identification document. At least some of these text, numerical and/or image data can be read directly by a viewer.

Although the manufacture of the data carrier and the recording of the individual user data are to be simple and inexpensive, there is the requirement that the cards are to be configured with optimal protection against forgery and falsification.

Methods for laser processing systems for the production of reversible image effects on laminates and of reversible images are known from EP 0 216 947 B1. A polycarbonate composite film of multiple thin films with security printing there between is produced in conventional ID-1 credit card format by means of lamination. Alphanumerical or graphical information is recorded in the composite film by means of a laser beam. In addition, an upper side of the card is provided with a so-called lenticular screen in a high-melting operation in a thermal transfer press. The upper edge of the lenticular screen is thereby arranged flush with the card body, so that the lens surface is protected when the card is in use. In order to record information, a laser beam is then directed at an oblique angle to the card surface through the lenses of the lenticular screen so formed. The laser beam is focused in the region of each lens and directed onto an inner plane of the card. Blackened regions defined by the laser beam are produced in that plane. In this manner, two authenticity features which are dependent on the viewing direction of the viewer are recorded in the card.

From US 2003/0102289 A1 there is known a device having a laser beam which allows an object to be inscribed from three sides without its position having to be changed. This device has a laser emitter for emitting a laser beam and at least one diverting means for imaging the laser beam from the laser emitter onto a focal point on the object. The laser emitter is additionally designed to emit a laser beam at at least two different exit angles, wherein, depending on the exit angle of a laser beam from the laser emitter, at least one laser beam is assigned to a mirror, so that at least two different sides of the object can be inscribed without changing the position of the object. In at least one of the beam paths there is provided a mirror, in order to compensate for the difference in optical wavelength between the first beam path and the further beam path.

From DE 199 49 945 A1 there is known a data carrier in card form comprising laminate layers, in which visually irreversible changes in the interior of the data carrier are effected by means of a laser beam, in such a manner that different graphical images are visible from different viewing angles, and methods for the production thereof. The laser inscription of the card takes place in a first method step without the aid of a lenticular screen, and the lenticular screen is applied only in a second method step. This method does not require a laser beam from two different directions. The desired optical reversible effect is achieved in that the corresponding microstructures which allow the recorded elements to be viewed differently from two different viewing angles are applied only after such elements have been recorded by means of a laser beam in a volume element of a data carrier.

DE 36 34 865 A1 relates to a data carrier in which information is recorded in an irreversibly visible manner by means of a laser beam in an inner volume region, and to methods for the production and checking of the data carrier, wherein the data carriers contain features which are not reproducible photographically or xerographically and which can easily be visually checked by machine and even under poor lighting conditions. A lenticular screen in the form of multiple cylindrical lenses or spherical lenses arranged next to one another is imprinted into a transparent film layer of a data carrier, which layer forms the cover film. This cover film is superimposed on a further transparent plastics layer, the optical properties of which change under the action of laser beams. Information is recorded on underlying volume regions of the data carrier by the laser beam through the lenses. The laser beam is thereby held at a specific angle to the plane of the lenticular screen. As the light of the laser beam passes through the lenses, it is refocused at the imprinted lenses. Information recorded in this manner is visible only at the angle at which the laser beam struck the surface of the lenticular screen, wherein the information is visible in a more or less large angle range depending on the size of the discolored volume region.

From WO 2008/055791 A1 (Mühlbauer) there is known a method and a device for recording information in a data carrier comprising a carrier layer and a transparent plastics layer. The method and the device allow a relief-based optical illusion to be recorded in the data carrier quickly and simply by means of a laser beam. The information is here inscribed into an information surface region of a data carrier by means of the laser beam of a point-like laser source. The laser beam is thereby deflected by means of a deflection surface before the laser beam impinges on the data carrier. For this purpose, the deflection surfaces are arranged in a region between the laser source and the data carrier and outside an intermediate region defined by notional straight connection lines between the laser source and edge regions of the information surface region.

These deflection surfaces or mirrors are expensive, sensitive and critical components. Adjustment of the deflection surfaces so that the laser beam strikes the information surface regions is relatively complex. In addition, the initial setup of the deflection surfaces for a new data carrier is difficult, because the orientation of the deflection surfaces to the location and the dimensions of the information surface region on the data carrier has to be newly determined in each case. In addition, the reflection surfaces must be cleaned regularly, since otherwise the intensity of the laser beam striking the information surface region of the data carrier is impaired. Moreover, it has hitherto been possible in the prior art to inscribe or record a reversible image on only one side of the data carrier, in particular in the case of data carriers in the form of passport booklets. The setting up of known devices is expensive, complicated and inaccurate, since the information surface region of the data carrier must first be moved to the focal point of the laser beam.

Furthermore, it is necessary for the production of a reversible image to adjust the deflection of the laser beam by means of mirrors, which is very difficult, expensive and complicated to set up. In the prior art, electronic components must also move when the mirrors are adjusted, which requires special flexible cable connections.

Further technological background is to be found in EP 1 705 600 A1.

SUMMARY

Starting from this situation, an inexpensive and robust arrangement and procedure for recording alphanumerical or graphical information or security features in a data carrier by means of a laser beam are to be provided.

In order to solve this problem, devices or methods having the features or steps of the independent claims are proposed.

In particular, a device for recording information in a data carrier has: a data carrier receptacle for at least partially receiving the data carrier in a planar manner; a data carrier cover which is arranged relative to the data carrier receptacle and is adapted for holding the data carrier between the data carrier receptacle and the data carrier cover; a laser source which is adapted for the controlled emission of a laser beam and which is adapted for effecting irreversible changes in the data carrier with the laser beam; a mount which receives the data carrier receptacle in such a manner that it is pivotable about a pivot axis; wherein the data carrier cover has an aperture which makes an information surface region of the data carrier accessible to a laser beam from the laser source; the mount of the data carrier receptacle has two or more positions in which the data carrier receptacle can be received in such a manner that it is repositionable and pivotable about the pivot axis; and the data carrier receptacle is pivotable to and fro about the pivot axis between two angular positions by means of a pivot drive, so that a laser beam from the laser source strikes the information surface region of the data carrier received in the data carrier receptacle at different angles of impact.

With this arrangement, the data carrier, for example the data page of a passport booklet, is to be provided with a MLI reversible image.

Alternatively or in addition, a device for recording information in a data carrier has: a data carrier receptacle for at least partially receiving the data carrier in a planar manner; a data carrier cover which is arranged relative to the data carrier receptacle and is adapted for holding the data carrier between the data carrier receptacle and the data carrier cover; a laser source which is adapted for the controlled emission of a laser beam and which is adapted for effecting irreversible changes in the data carrier with the laser beam; a mount which receives the data carrier receptacle in such a manner that it is rotatable about an axis of rotation; wherein the data carrier cover has a first aperture which makes an information surface region of the data carrier accessible to a laser beam from the laser source in a first rotational position; the data carrier receptacle has a second aperture which makes a side of the data carrier that is remote from the information surface region accessible to a laser beam from the laser source in a first rotational position; and the data carrier receptacle is pivotable to and fro about the pivot axis between two angular positions by means of a rotary drive, so that a laser beam from the laser source in the first angular position strikes the information surface region and in the second angular position strikes the side of the data carrier of the data carrier received in the data carrier receptacle that is remote from the information surface region.

With this arrangement, the data carrier, for example a passport booklet, can be inscribed by the laser beam on a data page and on an outer side, for example the front of the passport booklet.

Dimensions/forms/positions of device parts (e.g. data carrier receptacle, cover, frame) here relate also to sizes/corresponding forms of the data carrier. Although the data carrier is not part of the device, its dimensions and forms are related to the device in the dimensioning and form thereof and also the use of the device. A data carrier of the type discussed here is standardized to a certain extent in terms of its form, size or layout, since it is a security or identification document such as a passport, passport booklet, identity card, driving license, pass, credit card, bank card, cash payment card, label, admission pass, etc.

Data carriers can thus have, for example, credit card format (ID-1), which specifies a length of 85.60 millimeters and a width of 53.98 millimeters (3.370 by 2.125 inches) for the card. This format has been used for credit cards, telephone cards, credit cards, bank cards, cash payment cards for decades. Driving licenses and identity cards are also of ID-1 size in many countries.

Data carriers can, for example, also have identity card format (ID-2), which specifies a size of 105 millimeters by 74 millimeters (4.125 by 2.875 inches) for the card. This corresponds to DIN A7 format. Compared to ID-1, ID-2 offers slightly more space, which can be used for a larger passport photograph or for additional physical security features.

Data carriers can, for example, also have passport format (ID-3) with a size of 125 millimeters by 88 millimeters (4.875 by 3.5 inches), that is to say correspond to DIN B7 format, which determines the size of passports worldwide.

However, data carriers which are not subject to any or are subject to less standardization are clearly included here, since the limitations for the device which follow from the form, size or layout of the data carrier are immediately apparent, so that the exact dimensions or layout of the data carrier do not have to be contained in the definition of the device or of the method. A definition of an explicit combination of data carrier and device is also not necessary here.

The devices/methods described here permit a simple setup of the (X-) pivot axis or (Y-) axis of rotation for the data carriers and a repositioning of an orientation of the data carrier with its information surface region to the focal plane of the laser beam. Simple but precise conversion of the device for processing a first data carrier with an information surface region in a first position to a second data carrier with an information surface region in a second position is possible. For this purpose, the data carrier receptacle has two or more positions in which the data carrier receptacle can be received in its mount in such a manner that it is repositionable and pivotable about the (X–) pivot axis.

In these multiple positions, in a variant of the devices described here, an opening can be provided in each of the two long sides of the data carrier receptacle, into which opening there projects one end of a pivot pin, the other end of which is inserted into a (through-)opening of the mount. The openings on the two long sides of the data carrier receptacle to be chosen for the insertion of the pivot pins are thereby to be so chosen for a specific type of data carrier (for example a passport booklet) that, when the data carrier is received between the data carrier receptacle and the data carrier cover, the information surface region of the data carrier, in which a reversible image is to be recorded, is located inside the aperture of the data carrier cover.

In a variant of the devices described herein, the (through-) openings on the two long sides of the mount, in which the pivot pins are inserted, are in alignment with the center of the region covered by the laser beam. The data carrier receptacle in its mount can thus be pivoted about the (X–) pivot axis defined by the pivot pins and the openings.

Rapid repositioning of the device from inscribing a first side of the data carrier (for example the data page inside a passport booklet) to inscribing a second side of the data carrier (for example the outer front of the passport booklet) is also possible simply, quickly and accurately with the present device. For this purpose, the mount of the data carrier receptacle is rotated about its (Y–) axis of rotation (extending transversely to the above-described (X–) pivot axis) from its first end position (0°) into its second end position (180°), while the data carrier receptacle is held in the mount in its (0°) rest position not pivoted about the (X–) pivot axis. Accordingly, either the first side of the data carrier or the second side of the data carrier faces the laser beam.

Neither the receptacle nor the cover or the frame has electrical or electronic components. Consequently, it is also not necessary to supply power to such components via movable supply lines or movable connections, which increases the interference resistance and the reliability of the assembly as a whole.

The receptacle with its cover and the frame does not require any mirrors, does not have electronic components which move with it, and in each case is to be moved only about an axis of rotation or a pivot axis. In addition to the cost reduction which can thereby be achieved, the device can be set up for the particular inscribing task quickly and accurately without more in-depth technical understanding.

The data carriers in the form of security or identity documents of the type presented here are provided with line or dot patterns in the form of lines, concentric circles, planar lettering and/or a planar logo, for example in the form of guilloche patterns, as are also to be found on banknotes. The data carriers can also be provided with line or dot patterns, for example characters, monogram, guilloche patterns, stamps, national emblem and/or logo. These entries can be so arranged that they partly overlap with the photograph of the card holder inscribed by means of the laser beam. If this photograph is then inscribed on the substrate of the data carrier by means of the laser beam through the applied relief, the lens effect of the convex line or point pattern results in a modification of the grid points forming the photograph, so that there is obtained a substantially forgery-proof identity document, in particular passport booklet, which, because of the characteristic modification of the inscribed image pattern, cannot be either produced subsequently or modified subsequently.

In particular with the first variant of the device and of the method, the data carriers (security or identification documents) of the type presented here can be provided with CLI (changeable laser image) or MLI (multiple laser image) reversible images. This type of reversible image shows different graphics depending on the viewing angle. The data carriers thereby have individual or layered films which are irradiated with laser light beams from different angles. The use of CLI/MLI technology makes the data carriers more difficult to copy and is easy to check optically.

In particular with the second variant of the device, the inscription of the data carrier on two sides (front and back or outside and inside) can be achieved in a simple, quick and precisely adjustable manner.

The two devices/procedures can also be carried out in a combination in which both operations (reversible image production and inscription of the data carrier on two sides) can be carried out in an overall device.

The laser source can be arranged stationarily above a surface of the data carrier, and the data carrier located beneath it is rotated and/or tilted to and fro in order to perform one or both operations (reversible image production and/or inscription of the data carrier on two sides). This makes it possible to record the information (for example a relief-based reversible image) quickly and inexpensively with high precision, even in terms of the spatial resolution.

The variants presented here are less expensive compared to the prior art and offer a comparatively higher throughput of data carriers.

Further advantageous embodiments of the devices and of the procedures will become apparent from the dependent claims.

BRIEF DESCRIPTION OF THE DRAWINGS

Further features, properties, advantages, practicalities of the devices and of the procedures will become apparent from the following description in conjunction with the drawing. Possible modifications will also become clear for a person skilled in the art from the following description, in which reference is made to the accompanying drawings. The figures show schematically the devices discussed here. In the figures:

FIG. 1*a* shows, in a schematic representation, from outside, a data carrier of the type which can be processed by a device disclosed herein, in the form of a passport booklet;

FIG. 1*b* shows, in a schematic representation, a data carrier of the type which can be processed by a device disclosed herein, in the form of the data page found inside the passport booklet of FIG. 1*a*;

FIG. 2*a* shows, in a schematic perspective exploded representation, a data carrier receptacle with a data carrier cover;

FIG. 3*a* shows, in a schematic perspective representation, the data carrier receptacle with the data carrier cover in the mount in a 0° pivot position about the (X–) pivot axis;

FIG. 3b shows, in a schematic perspective representation, the data carrier receptacle with the data carrier cover in the mount in a 20° pivot position about the (X–) pivot axis;

FIG. 3c shows, in a schematic perspective representation, the data carrier receptacle with the data carrier cover in the mount in a +20° pivot position about the (X–) pivot axis;

DETAILED DESCRIPTION OF THE EMBODIMENTS

Figure 2B:
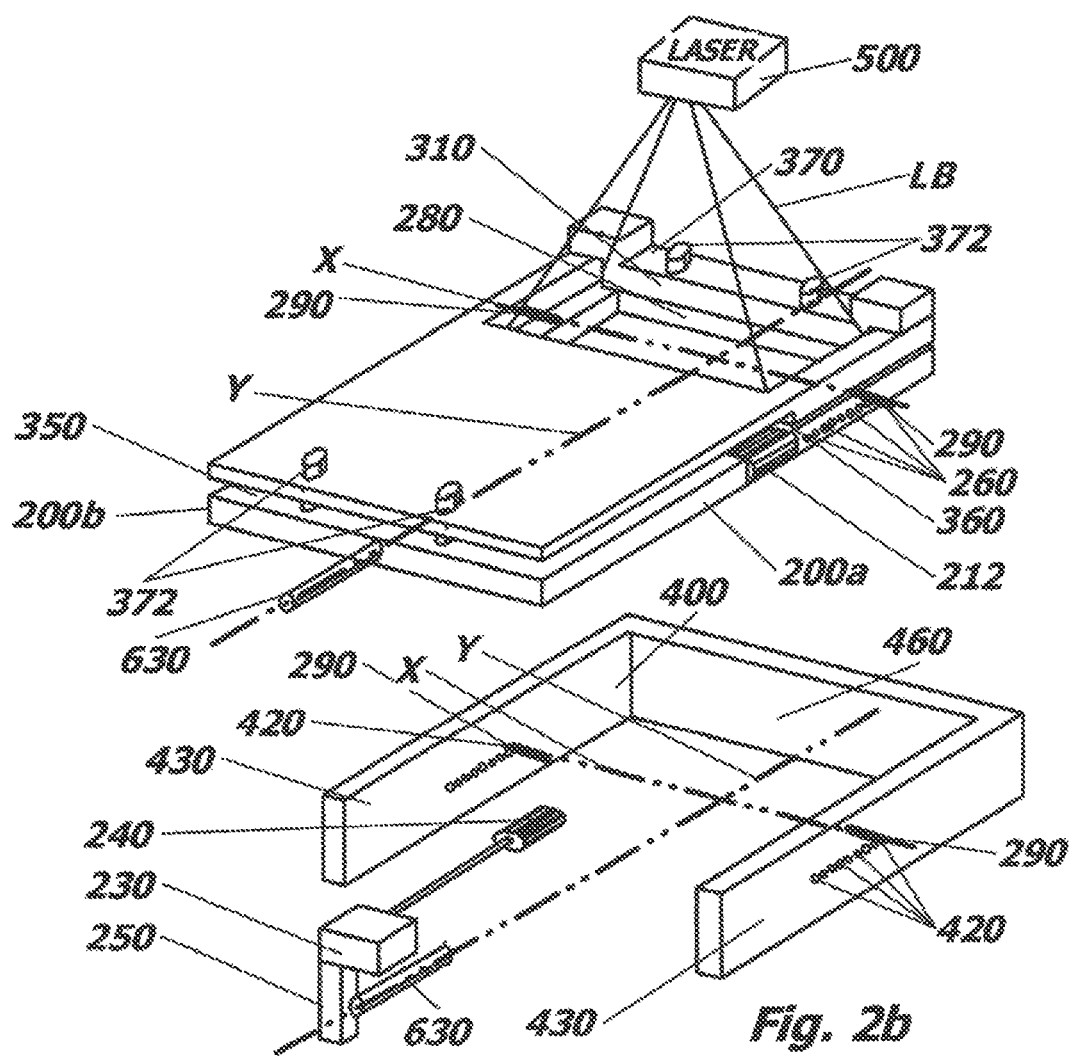
FIG. 2*b* shows, in a schematic perspective representation, the data carrier receptacle with the data carrier cover outside the mount.

FIG. 1a shows, from outside, a data carrier 100 in the form of a passport booklet of ID-3 passport format, in which, for example, the field "Name" is to be inscribed with the name of the passport holder in the manner described in detail below by means of variants of the device disclosed herein and of the procedures disclosed herein.

FIG. 1b shows the data page which is to be found inside the passport booklet of the data carrier 100 in the variant of the passport booklet from FIG. 1a. There are illustrated here in particular a photograph image field 110 and a data field 120 as well as an information surface region 130 in which, in the variant of the data carrier 100 shown here, a MLI (multiple laser image) reversible image can be recorded in the manner described in detail below by means of variants of the device disclosed herein and of the procedures disclosed herein. The reversible image is introduced by laser into a lens array which, depending on the type of data carrier, can be arranged at different points on the data carrier, for example at different points in the information region 130.

FIG. 2a illustrates an approximately rectangular data carrier receptacle 200 which has a data carrier cover 300 and is adapted to the dimensions 114, shown by broken lines, of the data carrier 100 in the form of an open passport booklet. The data carrier receptacle 200 is so dimensioned that the data carrier 100, when it is laid out flat, can be received thereon. In the orientation shown in FIG. 2a, the data carrier cover 300 is located above the data carrier receptacle 200, the data carrier cover serving to hold the data carrier 100 between the data carrier receptacle 200 and the data carrier cover 300 and to fix it in its orientation when the assembly as a whole with the data carrier 100 is rotated and/or pivoted in the manner described in detail below.

The data carrier cover 300 has a rectangular aperture 310 corresponding approximately to the dimensions of the data page of the passport booklet.

The data carrier receptacle 200 has an associated data carrier conveyor 210 in the form of a rubberized conveyor band 212. This conveyor band 212 encloses the data carrier receptacle 220 approximately centrally and circulates endlessly around two rollers 220 at the edges. The data carrier conveyor 210 additionally has a conveyor drive 230 which can be brought in and out of engagement with the conveyor band 212 via a toothed roller 240. For this purpose, the conveyor drive 230 can be pressed laterally against or pivoted away from the data carrier receptacle 200 via a lifting or pivoting device 250, in such a manner that the toothed roller 240 of the conveyor drive 230 rests in a form-fitting manner against the conveyor band 212 or comes clear therefrom. In this manner, the data carrier 100, that is to say the open passport booklet, can come into engagement with the conveyor band 212 in the region of its back fold and be conveyed in and out along the arrow P, depending on the direction of rotation of the conveyor drive 230, between the data carrier receptacle 200 and the data carrier cover 300, in such a manner that the information surface region 130 of the data carrier 100 is at least partially in alignment with the aperture 310 of the data carrier cover 210. In a further variant, a shaft extends from the toothed roller 240 to the conveyor drive 230, at the end of which shaft a pinion is seated in a rotationally fixed manner. The conveyor drive 230, on which a further toothed roller is located, is in engagement with the pinion via that toothed roller and can come clear from the pinion by the lifting or pivoting device 250. The conveyor 210 rotates or pivots with the data carrier receptacle 200 when it is rotated or pivoted.

The data carrier cover 300, together with the data carrier receptacle 200, forms a gap 350 for the data carrier 100 which is clearly illustrated in FIG. 2b, wherein the gap 350 is of a different height on both sides of the conveyor band 212. For this purpose, the data carrier cover 300 is provided with a step 360 on its side facing the data carrier receptacle 200. A passport booklet open at its data page thus fits into the gap 350 with its data page on the lower side of the step 360 and with its visa pages on the higher side of the step 360. The data carrier cover 300 has its aperture 310 on the lower side of the step 360. In the variant illustrated in FIGS. 2a and 2b, the height of the gap 350 is adjustable. For this purpose, a holding-down clamp 370 is provided in this variant, which holding-down clamp adjustably defines the height of the gap 350 for the thickness of the data carrier 100 by means of four screw pins 372 and respective plate springs. In a variant, the holding-down clamp 370 can have a holding-down drive. In another variant, the holding-down clamp 370 can be omitted. Instead, the data carrier cover 300 can have a drive for clamping the data carrier between the data carrier cover 300 and the data carrier receptacle 200 at least for the duration of the laser inscription.

In the arrangement according to FIG. 2b, a laser source 500 adapted for the controlled emission of a laser beam is provided above the data carrier receptacle 200 and the data carrier cover 300 in the region above the aperture 310 of the data carrier cover 300. This laser source 500 is so dimensioned in terms of its energy density that it can effect irreversible changes in the material of the data carrier 100.

The aperture 310 provided in the data carrier cover 300 allows a laser beam from the laser source 500 to strike an information surface region 130 of the data carrier 100 located between the data carrier receptacle 200 and the data carrier cover 300. The information surface region 130 of the data carrier 100 is thus accessible to a laser beam from the laser source 500. For controlling the inscription, a camera is arranged in a manner not illustrated further laterally to and above the aperture 310, which camera gives image data or position data to the controller when the data carrier is clamped between the data carrier receptacle 200 and the data carrier cover 300.

In FIG. 2b there is illustrated a mount 400 which receives the data carrier receptacle 200 in such a manner that it is pivotable about an X-pivot axis. This mount 400 is in the form of a U-shaped frame in which the data carrier receptacle 200 is pivotably received. The data carrier receptacle 200 has multiple positions 260 in which the data carrier receptacle 200 is received in the mount 400 in such a manner that it is pivotable about the X-pivot axis. The approximately rectangular, more precisely U-shaped, frame serving as the mount 400 for the data carrier receptacle 200 has a larger dimension transversely to the X-pivot axis than does the data carrier receptacle 200, so that the data carrier receptacle 200 can be repositioned in the different positions 260 in the X-pivot axis.

In each of these multiple positions 260, an opening is provided, in the illustrated variant, in each of the two long sides 200a and 200b of the data carrier receptacle 200, into which opening one end of a pivot pin 290 projects. The other end of the pivot pin 290 is inserted into a respective (through-)opening 420 of the mount 400. The openings in the two long sides 200a, 200b of the data carrier receptacle 200 are to be so chosen for a specific type of data carrier 100, in the illustrated example for a passport booklet, that, when the data carrier 100 is received between the data carrier receptacle 200 and the data carrier cover 300, the information surface region 130 of the data carrier 100, in which a reversible image is to be recorded in the manner described below, is located within the aperture 310 of the data carrier cover 300.

In the variant shown here, the (through-)openings 420 in the two long sides of the mount 400, in which the pivot pins 290 are inserted, are in alignment with the center of the region LB that is covered by the laser beam. The data carrier receptacle 200 in its mount 400 can thus be pivoted about the X-pivot axis defined by the pivot pins 290 in the openings 420 and the positions 260. The position 260 of the data carrier receptacle 200 to be used for insertion of the pivot pin 290 for a specific type of data carrier 100 is to be so chosen that, when the data carrier 100 is located on the data carrier receptacle 200, its information surface region 130, more specifically the center axis of a MLI lens array to be inscribed, is in alignment with the X-pivot axis.

In a variant which is not shown, the mount 400 can also have a single opening, for example in the form of a slot, instead of the openings 420. One end of the pivot pin protruding from the data carrier receptacle 200 can extend into the slot and be guided therein. The X-pivot axis can thus be infinitely adjusted to and fixed at two or more positions within the single opening by rotatably fixing the pivot pin at the desired position.

As is apparent, the data carrier conveyor 210, and in particular the conveyor band 212, is so oriented that the data carrier 100 is conveyed onto the data carrier receptacle 200 substantially parallel to the X-pivot axis.

The data carrier receptacle 200 has multiple positions 260 along the extent of its long sides 200a, 200b. The device can therefore easily be converted for data carriers 100 in which the information surface region 130 is in a different position on the data page of the data carrier 100. For this purpose, it is merely necessary to reposition the pivot pins 290 into different positions 260 of the data carrier receptacle 200. The data carrier receptable 200 in the mount 400 is thus repositionable and pivotable about the X-pivot axis.

The laser beam from the laser source 500 is thus to be directed onto the data carrier receptacle 200 into a region close to and along the pivot axis.

In order to perform the pivoting movements of the data carrier receptacle 200 about the X-pivot axis, the data carrier receptacle 200 is pivotable to and fro about the X-pivot axis defined by the pivot pins 290 between two angular positions, which are here denoted schematically -20°, +20°, by means of a pivot drive 600. This is illustrated in FIGS. 3a, 3b and 3c. FIG. 3a illustrates a 0° angular position, in which the data carrier 100 is to be transported by the conveyor 210 onto the data carrier receptacle 200. In the pivot positions of the data carrier receptacle 200 illustrated in FIGS. 3b and 3c, a laser beam from the laser source 500 strikes the information surface region 130 of the data carrier 100 received in the data carrier receptacle 200 in the angular positions -20° and 20°, respectively.

In the variant illustrated here, the stationarily mounted pivot drive 600 has a spindle 610 with which a spherical joint 620 movable between the angular positions -20° and +20° moves up and down when the rotates in one or the opposite direction. There is received in the spherical joint 620 one end of a rod 630, the other end of which is fastened to the data carrier receptacle 200. Instead of the spindle 610, a linear guide with a belt drive is used in another variant.

As is illustrated in FIGS. 2b, 3a to 3c, the U-shaped/rectangular frame 400 has in a variant two struts 430 which extend transversely to the X-pivot axis and in each of which multiple mutually spaced apart openings 420 for the pivot pins 290 are provided. As discussed above, the data carrier receptacle 200 has in each of its two sides 200a, 200b extending transversely to the X-pivot axis multiple mutually spaced apart openings at the positions 260, into each of which a pivot pin 290 is to be inserted, so that the data carrier receptacle 200 is pivotable about the X-pivot axis relative to the frame 400.

Before data carriers 100 of the same type, for example passport booklets, are inscribed with reversible images in their information surface region 130, the device is to be matched in a preparation phase to the geometric conditions of the data carriers 100, that is to say to the location of the information surface region 130 on the data page of the data carrier 100.

The data carrier receptacle 200 is thereby first brought by the pivot drive 600 into the 0° angular position (see FIG. 3a) and the conveyor drive 230 is pressed laterally against the data carrier receptacle 200 via the lifting or pivoting device 250 in such a manner that the toothed roller 240 of the conveyor drive 230 rests in a form-fitting manner against the conveyor band 212. The data carrier 100 is then transported onto the data carrier receptacle 200 by the conveyor 210 by actuation of the conveyor drive 230.

The data carrier 100 is thereby applied to the data carrier receptacle 200 so that the information surface region 130 on the data page of the data carrier 100 faces the laser source 500. The data carrier receptacle 200 and the positions of the openings 260 on both sides 200a and 200b of the data carrier receptacle 200 are then so positioned relative to the opening of the frame 420 that the information surface region 130 is located approximately centrally above the opening of the frame 400 and the laser beam from the laser source 500 strikes the information surface region 130 likewise approximately centrally. The alignment is complete when the pivot pins 290 are inserted through the respective openings in the frame 400 into the openings in the sides 200a, 200b into the position beneath the information surface region 130. The X-pivot axis thus extends through the two pivot pins 290 and through the center axis of the lens array to be inscribed. The conveyor drive 230 is then pivoted away from the data carrier receptacle 200 by the lifting or pivoting device 250 so that the toothed roller 240 of the conveyor drive 230 comes free from the conveyor band 212 over a wide area. The preparation phase of the device is thus complete.

The data carrier receptacle 200 can then be brought into the two pivot positions +20° and -20° (FIG. 3b, 3c), and a reversible image can in each case be inscribed at the necessary angle into the information surface region 130 by the laser beam from the laser source 500. It will be appreciated that the angles of +20° and -20° apply to some lens arrangements of reversible images, but other angles, for example approximately from +/-12° to +/-15°, can also be assumed with this device. For this purpose, it is simply necessary to design the pivot drive 600 to be movable further upwards or downwards.

One aspect in the preparation phase is that, with the preparation described above, the data carrier receptacle 200 can be received in the frame 400 in such a manner that it is pivotable about the X-pivot axis, so that the data carrier receptacle 200 assumes a pivot position in which the information surface region 130 of the data carrier 100 located on the data carrier receptacle 200 that is to be inscribed by means of the laser beam is substantially parallel to and close to the X-pivot axis.

In a following operating phase, individual data carriers 100 to be provided with a reversible image are introduced in succession by the data carrier conveyor 210 in a planar manner between the data carrier receptacle 200 and the data carrier cover 300, arranged at a distance relative to the data carrier receptacle 200, for holding the data carrier 100 between the data carrier receptacle 200 and the data carrier cover 300. The information surface region 130 of the data carrier 100 located on the data carrier receptacle 200 thereby comes to lie in the region of the aperture 310 of the data carrier cover 300 above the X-pivot axis and is accessible to the laser beam from the laser source 500.

The conveyor drive 230 is then pivoted away, whereby the toothed roller 240 comes free from the conveyor band 212. The pivot drive 600 then pivots the data carrier receptacle 200 with the data carrier cover 300 and a data carrier 100 located therebetween about the X-pivot axis into a first angular position, for example −20°. By controlled emission of the laser beam from the laser source 500, information in the form of, for example, a reversible image is recorded in the information surface region 130 of the data carrier 100 in this first angular position in the form of irreversible changes in the data carrier 100.

The pivot drive 600 then pivots the data carrier receptacle 200 with the data carrier cover 300 and the data carrier 100 located therebetween about the X-pivot axis into a second angular position, for example +20°. In this second angular position too, information in the form of, for example, a reversible image is recorded in the information surface region 130 of the data carrier 100 in the form of irreversible changes in the data carrier 100 by controlled emission of the laser beam from the laser source 500.

The pivot drive 600 then pivots the data carrier receptacle 200 with the data carrier cover 300 and the data carrier 100 located therebetween about the X-pivot axis into the 0° angular position. For the rest, during the inscription of the information surface region 130 of the data carrier 100, the mount 400 of the data carrier receptacle 200 together with the data carrier receptacle 200 remains in its first end position 0° about its Y-axis of rotation extending transversely to the X-pivot axis.

The conveyor drive 230 is then pivoted inwards, so that the toothed roller 240 comes into engagement with the conveyor band 212. The data carrier 100 located between the data carrier receptacle 200 and the data carrier cover 300 is conveyed out. This can take place in the opposite direction to the direction of introduction, or in the same direction as the direction of introduction.

The operating phase procedure is repeated with a new data carrier 100.

In a further aspect, the device for recording information in the data carrier 100 is so configured that the mount 400 of the data carrier receptacle 200 together with the data carrier receptacle 200 can be rotated about its Y-axis of rotation extending transversely to the X-pivot axis from a first end position 0° into a second end position 180°. The data carrier receptacle 200 is thereby held in the mount 400 in its 0° rest position not pivoted about the X-pivot axis. In this operation of rotation about the Y-axis of rotation, either a first side, for example the data page inside the passport booklet, or a second side of the data carrier, for example the outer front of the passport booklet, faces the laser beam of the laser source 500 for inscription.

Approximately in the region of the aperture 310 of the data carrier cover 300, the data carrier receptacle 200 likewise has an aperture 280, which in a first rotational position 0° (see FIG. 4a) about the Y-axis of rotation makes the information surface region 130 of the data carrier 100 accessible to a laser beam from the laser source 500. The frame 400 is thereby provided on its transverse web 460 centrally along the Y-axis of rotation with a rotation pin 470, via which a rotary drive 480 (not shown) rotates the frame 400 together with the data carrier receptacle 200, the data carrier cover 300 and the data carrier 100 located therebetween to and fro between the first end position 0° (see FIG. 4a) and the second end position 180° (see FIG. 4b). On rotation into the second end position 180°, the aperture 310 of the data carrier cover 300 faces away from the laser source 500, so that the side of the data carrier 100 remote from the information surface region 130, that is to say the outer front of the passport booklet when the passport booklet is open, is accessible to a laser beam from the laser source 500.

This configuration of the device has the result that the data carrier receptacle 200 is rotatable by the rotary drive 480 to and fro about the Y-axis of rotation between the two angular positions 0° and 180°, so that a laser beam from the laser source 500 in the first angular position 0° strikes the information surface region 130 and in the second angular position 180° strikes the side of the data carrier 100 of the data carrier 100 received in the data carrier receptacle 200 that is remote from the information surface region 130.

It will be appreciated that this previously described variant of the device can be combined with the above-described variant, as is also illustrated in the figures. Alternatively, in variants of the device, only the rotation about the Y-axis of rotation or the pivoting about the X-pivot axis is carried out.

In alternatives in which only the rotation about the Y-axis of rotation or the pivoting about the X-pivot axis is carried out, the data carrier receptacle 200 can also have an associated data carrier conveyor 210 which is adapted to convey a data carrier 100 between the data carrier receptacle 200 and the data carrier cover 300 in such a manner that the information surface region 130 of the data carrier 100 is at least partially in alignment with the aperture 310 of the data carrier cover 300.

In these variants, the mount of the data carrier receptacle 200 can have an approximately rectangular frame which has a larger dimension transversely to the Y-axis of rotation than does the data carrier receptacle 200, so that the data carrier receptacle 200 can be rotated to and fro about the X-axis of rotation between the first and the second angular position.

The data carrier conveyor 210 is here adapted to convey the data carrier 100 onto the data carrier receptacle 200 substantially along the X-axis of rotation.

In this variant too, the data carrier conveyor 210 has a conveyor band 212 which circulates around the data carrier receptacle 210 and which is adapted to come into engagement with a data carrier 100 in the form of a passport booklet in the region of a back fold thereof and to convey it between the data carrier receptacle 200 and the data carrier cover 300 substantially along the X-axis of rotation.

Here too, the data carrier conveyor 210 has a data carrier conveyor drive 230 which can be brought in a controlled manner into and out of engagement with the circulating conveyor band 212, in order to set the conveyor band in circulation.

In particular for the rotation of the data carrier 100 about the X-axis of rotation, the data carrier cover 300 together with the data carrier receptacle 200 provides a gap for the data carrier 100, wherein the gap is of a different height on both sides of the conveyor band 212. In particular in the region of the aperture 310 of the data carrier cover 300, the gap is smaller than on the other side of the conveyor band 212.

The data carrier cover 300 together with the data carrier receptacle 200 forms a gap 350, clearly illustrated in FIG. 2b, for the data carrier 100, wherein the gap 350 is of a different height on both sides of the conveyor band 212. For this purpose, the data carrier cover 300 is provided with a step 360 on its side facing the data carrier receptacle 200. A passport booklet which is open at its data page thus fits into the gap 350 with its data page on the lower side of the step 360 and with its visa pages on the higher side of the step 360. The data carrier cover 300 has its aperture 310 on the lower side of the step 360. In the variant illustrated in FIGS. 2a and 2b, the height of the gap 350 is adjustable. For this purpose, a holding-down clamp 370 is provided in this variant, which holding-down clamp adjustably defines the height of the gap 350 for the thickness of the data carrier 100 by means of four screw pins 372 and respective plate springs. In another variant, the holding-down clamp 370 can have a holding-down drive. In another variant, the holding-down clamp 370 can be omitted. Instead, the data carrier cover 300 can have a drive for clamping the data carrier between the data carrier cover 300 and the data carrier receptacle 200 at least for the duration of the laser inscription. It is also possible to define the gap by means of two adjusting elements on the end faces. The screw pins 372 can then in corresponding slots of the width adjustment and the receiving of two pressure springs for pressing the data carrier cover 300 onto the data carrier 100.

In a further variant, a spring is provided between the cover 300 and the two ends of the holding-down clamp 370. The holding-down clamp 370 is laterally displaceable and fixable, in order to adjust the width for supporting the passport to be processed in a preparation phase. The holding-down clamp 370 can, however, also be fixedly mounted on the cover 300 for lateral guiding of the data carrier 100.

As a further alternative, a rod can be provided behind the holding-down clamp and parallel thereto for the clamping of the data carrier 100 by the holding-down clamp together with the data carrier cover 300. A ram, actuated by a drive, presses a head at the end of the rod which is loaded by a coil spring and is displaceable relative to the rod. The spiral spring is wound around the rod. On the head there is a bevel, which pushes the cover against the data carrier to be clamped.

All these variants serve to clamp the data carrier cover 300 in an adjustable manner against the data carrier receptacle.

In order inscribe data carriers 100 of the same type, for example passport booklets, with information, the following steps are carried out according to a variant:

First of all, the data carrier receptacle 200 is brought into the 0° angular position (see FIG. 3a or 4a) by the pivot drive 600, and the conveyor drive 230 is pressed laterally against the data carrier receptacle 200 via the lifting or pivoting device 250 in such a manner that the toothed roller 240 of the conveyor drive 230 rests in a form-fitting manner against the conveyor band 212. The data carrier 100 is then transported onto the data carrier receptacle 200 by the conveyor 210 by actuation of the conveyor drive 230.

The data carrier 100 is thereby applied to the data carrier receptacle 200 so that the information surface region 130 on the data page of the data carrier 100 faces the laser source 500. The conveyor drive 230 is then pivoted away from the data carrier receptacle 200 by the lifting or pivoting device 250 in such a manner that the toothed roller 240 of the conveyor drive 230 comes free from the conveyor band 212 over a wide area. The preparation phase of the device is thus complete.

The data carrier receptacle 200 with the data carrier 100 can then be brought into the two rotational positions 0° and 180° (FIG. 4a, 4b) by means of the rotary drive, wherein positions between the two rotational positions 0° and 180° are also possible, and (alphanumerical or graphical) data can there be inscribed in the information surface region 130 and/or the data field 120 and/or in the photograph image field 110 by the laser beam from the laser source 500.

Figure 4A:
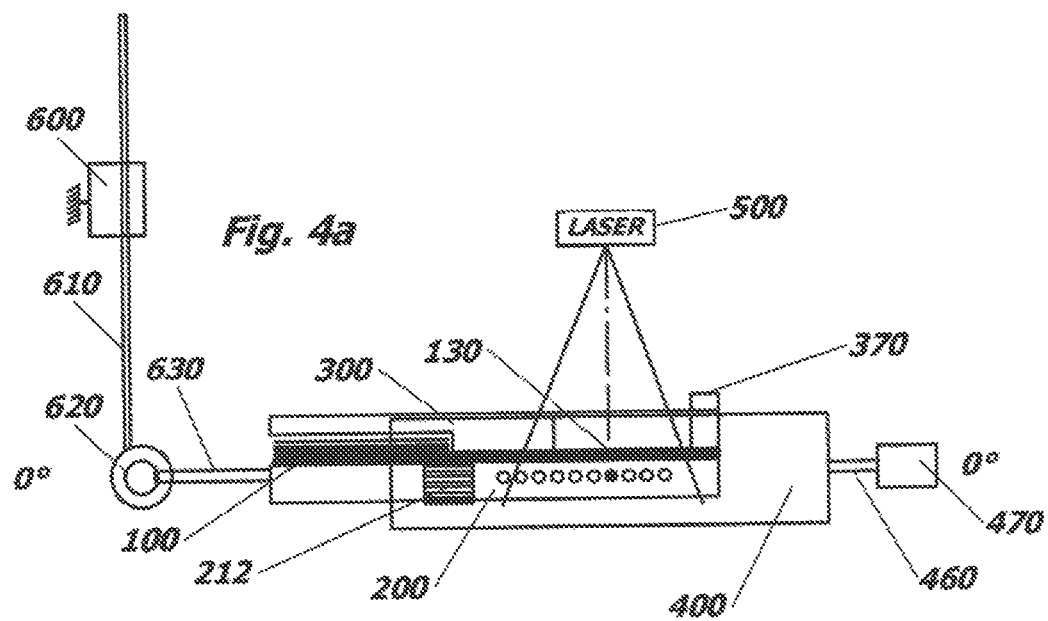
FIG. 4a shows, in a schematic perspective representation, the data carrier receptacle with the data carrier cover in the mount in a 0° rotational position about the (Y–) axis of rotation.
Figure 4B:
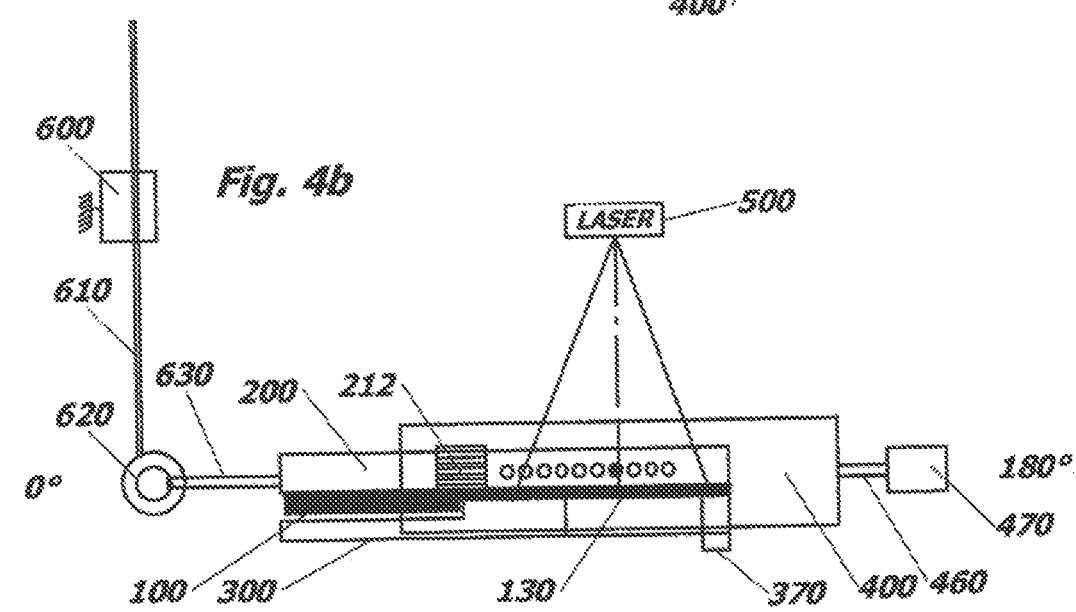
FIG. 4b shows, in a schematic perspective representation, the data carrier receptacle with the data carrier cover in the mount in a 180° rotational position about the (Y–) axis of rotation.

For this purpose, the data carrier receptacle with the data carrier cover and a data carrier located therebetween is first positioned about an axis of rotation in a first angular position, for example 0°, see FIG. 4a. The data carrier receptacle 200 is thus so received in the frame 400, in such a manner that it is rotatable about the Y-axis of rotation, that the data carrier receptacle 200 assumes a rotational position in which the side 130 of the data carrier 100 located on the data carrier receptacle 200 that is to be inscribed faces the laser source 500.

By controlled emission of a laser beam from the laser source 500, which is adapted to effect irreversible changes in the data carrier 100 with the laser beam, information is recorded on the side of the data carrier 100 in the side of the data carrier having the information surface region. The rotary drive 470 then pivots the frame 400 with the data carrier receptacle 200, the data carrier cover 300 and the data carrier 100 located therebetween about the Y-axis of rotation into a second angular position, for example 180°, see FIG. 4b. Here too, by controlled emission of the laser beam from the laser source 500, in the form of irreversible changes in the data carrier 100, the outer front of the passport booklet is inscribed in this second angular position information in the form of, for example, alphanumerical or graphical data is recorded.

The mount 400 then pivots the data carrier receptacle 200 together with the data carrier receptacle 200 about its Y-axis of rotation extending transversely to the X-pivot axis into its first end position 0°, and the pivot drive 600 holds the data carrier receptacle 200 with the data carrier cover 300 and the data carrier 100 located therebetween in the 0° angular position about the X-pivot axis.

The conveyor drive 230 is then pivoted in, so that the toothed roller 240 comes into engagement with the conveyor band 212. The data carrier 100 located between the data carrier receptacle 200 and the data carrier cover 300 is conveyed out. This can take place in the opposite direction to the direction of introduction or in the same direction as the direction of introduction.

The above-described variants of the device and the structural and operational aspects thereof serve merely for better understanding of their structure, mode of functioning and properties; they do not limit the disclosure, for example, to the exemplary embodiments. The figures are in some cases schematic, whereby essential properties and effects are in some cases shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be associated with the described procedure. Combinations between all the individual embodiments in the text, that is to say in every section of the description, in the claims, and also combinations between different variants in the text, in the claims and in the figures, are also included. The claims also do not limit the disclosure and thus the possible combinations of all the indicated features with one another. All the disclosed features are explicitly also disclosed herein individually and in combination with all the other features.

The invention claimed is:

1. A device for recording information in a data carrier, said device comprising:
    a data carrier receptacle at least partially receiving the data carrier in a planar manner;
    a data carrier cover that is arranged relative to the data carrier receptacle and is configured to hold the data carrier between the data carrier receptacle and the data carrier cover;
    a laser source for emitting a laser beam that provides irreversible changes in the data carrier; and
    a mount coupled to the data carrier receptacle so that the receptacle is pivotable about a pivot axis; wherein
    the data carrier cover includes an aperture providing an information surface region that is accessible to the laser beam;
    the data carrier receptacle includes two or more positions so that the data carrier receptacle can be received in the mount so as to be repositionable and pivotable about the pivot axis; and
    the data carrier receptacle is pivotable about the pivot axis between two angular positions by a pivot drive, so that the laser beam strikes the information surface region at different angles.

2. The device for recording information in a data carrier as claimed in claim 1, wherein the data carrier receptacle has an associated data carrier conveyor adapted to convey the data carrier between the data carrier receptacle and the data carrier cover in such a manner that the information surface region of the data carrier is at least partially in alignment with the aperture of the data carrier cover.

3. The device for recording information in a data carrier as claimed in claim 2, wherein the data carrier conveyor is adapted to convey the data carrier onto the data carrier receptacle substantially parallel to the pivot axis.

4. The device for recording information in a data carrier as claimed in claim 2, wherein the data carrier conveyor has a conveyor band that circulates around the data carrier receptacle and is adapted to come into engagement with the data carrier in the form of a passport booklet in a region of a back fold thereof and to convey the data carrier between the data carrier receptacle and the data carrier cover substantially parallel to the pivot axis.

5. The device for recording information in a data carrier as claimed in claim 1, wherein the laser beam is directed onto the data carrier receptacle along the pivot axis.

6. The device for recording information in a data carrier as claimed in claim 1, wherein the mount includes an approximately rectangular frame having a larger dimension in a direction transversely to the pivot axis than the data carrier receptacle, so that the data carrier receptacle can be repositioned in two or more positions along the pivot axis.

7. The device for recording information in a data carrier as claimed in claim 6, wherein
    the rectangular frame includes two struts extending transversely to the pivot axis, said struts each including multiple openings that are spaced apart from one another; and/or
    the data carrier receptacle includes multiple openings that are spaced apart from one another and that accept a pivot pin that mounts the data carrier receptacle so that the receptacle is pivotable about the pivot axis relative to the frame.

8. The device for recording information in a data carrier as claimed in claim 4, wherein the data carrier conveyor has a data carrier conveyor drive that can be brought in a controlled manner into and out of engagement with the conveyor band in order to set the conveyor band in circulation.

9. The device for recording information in a data carrier as claimed in claim 4, wherein the data carrier cover together with the data carrier receptacle provides a gap for the data carrier, wherein the gap is of a different height on both sides of the conveyor band and is smaller in a region of the aperture of the data carrier cover than on the other side of the conveyor band.

10. The device for recording information in a data carrier as claimed in claim 9, wherein a height of the gap is adjustable, and wherein the height of the gap can be adjusted by a holding-down clamp.

11. A method for recording information in a data carrier, wherein in a preparation phase:
    a data carrier receptacle, which has two or more pivot positions in which the data carrier receptacle can be received in a mount in such a manner that the receptacle is repositionable and pivotable about a pivot axis, is brought into a pivot position in which an information surface region of the data carrier located on the data carrier receptacle that is to be inscribed by a laser beam is located substantially parallel to the pivot axis; and
in an operating phase:
    introducing the data carrier in an at least partially planar manner between the data carrier receptacle and a data carrier cover, arranged relative to the data carrier receptacle, for holding the data carrier between the data carrier receptacle and the data carrier cover, wherein the data carrier cover has an aperture that makes the information surface region of the data carrier accessible to the laser beam;
    pivoting the data carrier receptacle with the data carrier cover and the data carrier located therebetween about the pivot axis into a first angular position;
    emitting the laser beam in a controlled manner from a laser source, which is adapted to effect irreversible changes in the data carrier with the laser beam, onto the information surface region of the data carrier in the first angular position in order to record information in the information surface region of the data carrier;
    pivoting the data carrier receptacle with the data carrier cover and the data carrier located therebetween about the pivot axis into a second angular position;
    emitting the laser beam in a controlled manner from the laser source onto the information surface region of the data carrier in the second angular position in order to record information in the information surface region of the data carrier; and
    releasing the data carrier from the data carrier receptacle.

12. A device for recording information in a data carrier comprising:
- a data carrier receptacle for at least partially receiving the data carrier in a planar manner;
- a data carrier cover that is arranged relative to the data carrier receptacle and is configured to hold the data carrier between the data carrier receptacle and the data carrier cover;
- a laser source for emitting a laser beam that provides irreversible changes in the data carrier;
- a mount coupled to the data carrier receptacle so that the receptacle is rotatable about an axis of rotation; wherein
- the data carrier cover includes a first aperture providing an information surface region that is accessible to the laser beam in a first rotational position;
- the data carrier receptacle includes a second aperture that makes a side of the data carrier that is remote from the information surface region accessible to the laser beam in a second rotational position; and
- the data carrier receptacle is rotatable about the axis of rotation between the two rotational positions by a rotary drive, so that the laser beam in the second rotational position strikes the information surface region and in the first rotational position strikes the side of the data carrier received in the data carrier receptacle that is remote from the information surface region.

13. The device for recording information in a data carrier as claimed in claim 12, further comprising a data carrier conveyor that includes a data carrier conveyor drive that can be brought in a controlled manner into and out of engagement with a conveyor band in order to set the conveyor band in circulation.

14. The device for recording information in a data carrier as claimed in claim 13, wherein the data carrier cover together with the data carrier receptacle provides a gap for the data carrier, wherein the gap is of a different height on both sides of the conveyor band, and is smaller in a region of the aperture of the data carrier cover than on the other side of the conveyor band.

15. The device for recording information in a data carrier as claimed in claim 14, wherein a height of the gap is adjustable, and wherein the height of the gap can be adjusted by a holding-down clamp.

16. The device for recording information in a data carrier as claimed in claim 12 wherein the data carrier receptacle includes an associated data carrier conveyor configured to convey the data carrier between the data carrier receptacle and the data carrier cover so that the information surface region of the data carrier is at least partially in alignment with the aperture, and wherein the data carrier conveyor includes a conveyor band that circulates around the data carrier receptacle and is configured to come into engagement with the data carrier in the form of a passport booklet in a back fold region and to convey the data carrier between the data carrier receptacle and the data carrier cover substantially along a pivot axis of the data carrier receptacle.

17. A method for recording information in a data carrier, having the steps:
- introducing the data carrier in an at least partially planar manner between a data carrier receptacle and a data carrier cover, arranged relative to the data carrier receptacle, for holding the data carrier between the data carrier receptacle and the data carrier cover, wherein the data carrier receptacle includes an aperture that makes an information surface region of the data carrier, and
- positioning the data carrier receptacle with the data carrier cover and the data carrier located therebetween about an axis of rotation into a first rotational position;
- emitting a laser beam from a laser source, which is adapted to effect irreversible changes in the data carrier, onto the side of the data carrier in the first rotational position in order to record information in the side of the data carrier having the information surface region;
- positioning the data carrier receptacle with the data carrier cover and the data carrier located therebetween about the axis of rotation into a second rotational position;
- emitting the laser beam onto the side of the data carrier that is remote from the information surface region in the second rotational position in order to record information in the side that is remote from the information surface region; and
- releasing the data carrier from the data carrier receptacle.

18. The method as claimed in claim 17 wherein the data carrier receptacle includes an associated data carrier conveyor that is configured to convey a data carrier between the data carrier receptacle and the data carrier cover so that the information surface region of the data carrier is at least partially in alignment with the aperture of the data carrier cover, and wherein the data carrier conveyor has a conveyor band that circulates around the data carrier receptacle and is configured to come into engagement with the data carrier in the form of a passport booklet in a back fold region and to convey it between the data carrier receptacle and the data carrier cover substantially along a pivot axis of the data carrier receptacle.

* * * * *

UNITED STATES PATENT AND TRADEMARK OFFICE
CERTIFICATE OF CORRECTION

| | | |
|---|---|---|
| PATENT NO. | : 11,794,508 B2 | Page 1 of 1 |
| APPLICATION NO. | : 16/971224 | |
| DATED | : October 24, 2023 | |
| INVENTOR(S) | : Sascha Egermann | |

It is certified that error appears in the above-identified patent and that said Letters Patent is hereby corrected as shown below:

On the Title Page

The PCT filing data states:
PCT Filed: Feb. 2, 2019
This should be corrected to:
PCT Filed: Feb. 12, 2019

Signed and Sealed this
Twelfth Day of December, 2023

*Katherine Kelly Vidal*

Katherine Kelly Vidal
*Director of the United States Patent and Trademark Office*